United States Patent [19]

Shaw et al.

[11] Patent Number: 5,429,437

[45] Date of Patent: Jul. 4, 1995

[54] COLLAPSIBLE, SELF-EXPANDING LIQUID CONTAINER

[75] Inventors: Mark D. Shaw, Ponte Vedra; J. Tad Heyman; Laurence M. Bierce, both of Jacksonville, all of Fla.; Dorian T. True, III, Augusta, Ga.; Marion L. Jones, Jr., North Augusta, S.C.

[73] Assignee: UltraTech International, Inc., Jacksonville, Fla.

[21] Appl. No.: 287,761

[22] Filed: Aug. 9, 1994

[51] Int. Cl.⁶ .................................... B65D 33/30
[52] U.S. Cl. ............................ 383/33; 383/43; 383/71; 383/127; 220/9.2; 220/904
[58] Field of Search ............... 383/3, 33, 43, 70, 71, 383/104, 119, 127; 220/9.2, 9.3, 904

[56] References Cited

U.S. PATENT DOCUMENTS

| | | | |
|---|---|---|---|
| 1,897,018 | 2/1933 | Draheim | 383/71 X |
| 2,664,131 | 12/1953 | Miller | 220/9.2 X |
| 2,754,869 | 7/1956 | Bartels | 383/33 X |
| 2,854,049 | 9/1958 | Wyllie | 383/3 X |

FOREIGN PATENT DOCUMENTS 2600988  1/1988  France ................. 383/3

Primary Examiner—Allan N. Shoap
Assistant Examiner—Jes F. Pascua
Attorney, Agent, or Firm—Thomas C. Saitta

[57] ABSTRACT

A liquid container especially suited for use in the capture of liquid hazardous materials is disclosed, the container comprising a bottom, preferably circular, and a generally vertical wall, preferably annular or conical, attached to the perimeter of the bottom to form a container with a large open top. The bottom and wall are composed of a flexible, liquid impermeable material, preferably a material that is also chemical resistant and wear resistant. The container may further comprise a liner. The top edge of the wall incorporates a semi-rigid floating member which completely encircles the opening, the floating member being collapsible or foldable for storage purposes. The perimeter portion of the bottom incorporates a structural or frame member which is composed of a flexible, resilient material which provides rigidity to the perimeter and acts to spread the bottom to its maximum size. The frame member is collapsible on itself such that the device can be collapsed into a small size for storage. The frame member is self-opening from the collapsed state to the full open rigid state.

8 Claims, 1 Drawing Sheet

COLLAPSIBLE, SELF-EXPANDING LIQUID CONTAINER

BACKGROUND OF THE INVENTION

The invention relates generally to the field of collapsible, self-expanding liquid containers. More specifically, the invention relates to the field of such devices adapted for use in the emergency containment of hazardous liquids, in which a flexible, resilient structural member provides a static configuration to the device but can be collapsed to create a compact size for storage purposes, and in which a semi-rigid floatation member raises the side walls of the device during liquid capture—the flexible resilient structural member self-opening from the collapsed position to provide a large perimeter for liquid capture without the necessity for continued manual manipulation and positioning.

Many common liquids in use in our modern society are not environmentally friendly and some are dangerous to the point that any contact must be avoided. Rapid containment of liquid hazardous waste in the event of accidental leaks or ruptures in transport vehicles or storage containers is essential to protect the environment and prevent injury to persons. The problem is compounded by the fact that human contact with many of the liquids must be avoided at all costs. It is therefore desirable to have a device readily on hand which can be used to contain the liquid spills, yet is constructed such that it can be rapidly positioned to capture the liquid with a minimum of handling. To be readily accessible in transport vehicles, it is also necessary to provide a device which can be stored in a small space.

The simplest, yet most effective, configuration for a container of this sort is one with a flat, round bottom, an annular side wall around the perimeter of the bottom and an open top. For ease of storage, the bottom and walls should be made of a flexible, liquid impermeable material with no rigid structural components. Obviously, containers of this type are well known. The problem with using such containers in a hazardous spill situation is that these containers require excessive handling to unfold the material and spread the bottom out under the spill source to capture the liquid. Often the liquid is so hazardous that human contact is not acceptable, in which case the person cannot position the container under the spill source without extreme danger.

As an example, U.S. Pat. No. 4,383,564 to Hoie shows a collapsible liquid container made of a foldable, liquid impermeable material having a round bottom and an annular side wall with an open top. The top incorporates a ring shaped float to define the open top, the ring acting to raise the side walls as liquid fills the interior of the container. The device can be folded down to a small overall size for storage purposes as there is no internal framework or rigid structure. This device however is unsuitable for use as a containment collector for liquid hazardous waste spills since to set up the device to receive the liquid requires the user to manually unfold and centrally position the open top under the spill source. The bottom has no rigid structure so proper positioning would require pulling the material through the liquid hazardous waste in order to center the top opening. It would be practically impossible for the user to position this device without coming into contact with large amounts of the hazardous liquid.

It is an object of this invention to provide a collapsible container for hazardous liquids which has sufficient structural rigidity such that the container can be positioned by throwing the container rather than direct manual placement. It is a further object to provide such a container where the framework structure providing the rigidity is collapsible to allow for storage of the device in a small space. It is a further object to provide such a container where the framework is self-opening from the collapsed storage position.

SUMMARY OF THE INVENTION

The invention comprises a liquid container especially suited for use in the capture of liquid hazardous materials leaking or spilling from a broken or ruptured transport vehicle or storage container. The container is comprised of a bottom, preferably circular, and a generally vertical wall, preferably annular or conical, attached to the perimeter of the bottom. The bottom and wall are composed of a flexible, liquid impermeable material, preferably a material that is also chemical resistant: and wear resistant. The combination of the bottom and the wall form a liquid container with an open top. In the preferred embodiment, the device further comprises a liner made of a different material from the bottom and wall. With this dual structure, the outer bottom and wall can be composed of a material with high strength, durability and wear resistance, while the liner is composed of a liquid impermeable material with good chemical resistance. Preferably the open top is slightly smaller in circumference than the bottom. The top edge of the wall incorporates a semi-rigid floating member which completely encircles the opening, the floating member being collapsible or foldable for storage purposes. The perimeter portion of the bottom incorporates a structural or frame member which is composed of a flexible, resilient material which provides rigidity to the perimeter and acts to spread the bottom to its maximum size. The frame member is collapsible on itself such that the device can be collapsed into a small size for storage. The frame member is self-opening from the collapsed state to the full open rigid state. Preferably, the frame member is comprised of a thin, circular strip of spring steel. Spring steel in this configuration maintains its full annular shape unless twisted, upon which it collapses on itself to form a number of smaller coils in a stable relationship. The device is twisted to collapse the container for storage. To use the container in an emergency situation, the device is jolted or manipulated such that the coils become unstable and the frame restores itself to the full open circular configuration—thereby spreading the bottom and the open top to their widest configurations. Because the device is self-opening and has a stable structure when in use, the device can be thrown or tossed into proper position to capture leaking hazardous liquid without requiring the user to physically contact the liquid. The semi-rigid floating member, now unfolded, acts to raise the side walls as the liquid volume in the interior of the device increases.

DETAILED DESCRIPTION OF THE INVENTION

With reference to the drawings, the invention will now be described as to the best mode and preferred embodiment for its practice. The invention comprises a liquid container especially adapted for use in the capture of liquid hazardous materials leaking or spilling from a broken or ruptured vehicle or storage container, as well as for use in any circumstance where liquid containment is desired. The invention is self-opening to a stable liquid receiving state, yet collapsible to a smaller size for storage purposes. The invention is structured to have a large upper opening to receive the liquid and is constructed to have a large receiving capacity.

Figure 2:
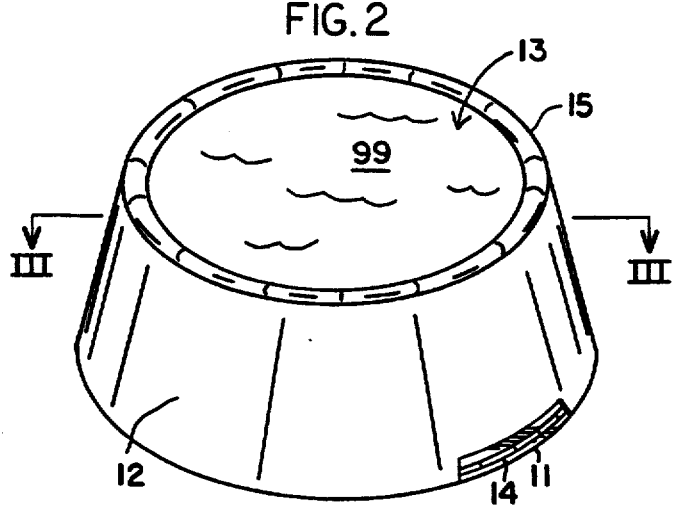
FIG. 2 shows the invention in its open position with liquid contained therein, with a portion of the bottom perimeter exposed to show the frame member.
Figure 1:
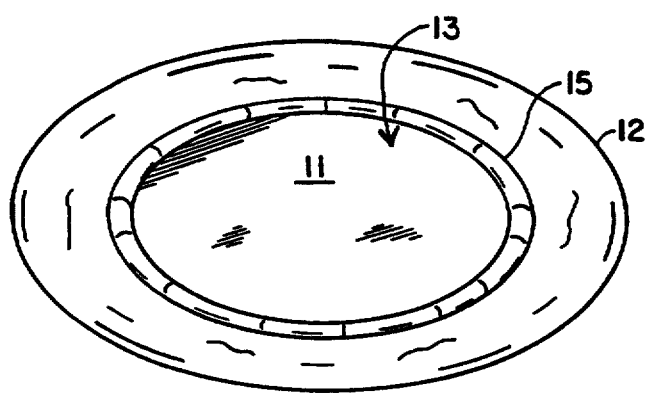
FIG. 1 shows the invention in its open configuration with no liquid contained therein.

As shown in FIGS. 1 and 2, the invention comprises a bottom member 11, a side wall 12 attached to the perimeter of bottom 11 to form a container having an open top 13, a resilient frame member 14 and a floating member 15. The bottom 11 and wall 12 are made of a flexible, liquid impermeable material or fabric having good chemical and wear resistance, such as for example woven polyethylene sheeting with polyethylene film laminated to both sides. The lower edge of the wall 12 is attached to the perimeter of bottom 11 in any known manner (e.g., adhesives, stitching, heat seal) which produces a liquid impermeable and durable seal such that no liquid can escape between the two members. In this manner, the bottom 11 and wall 12 form an open topped container with generally vertical sides. It is preferred that wall 12 be slightly conical rather than annular, whereby the upper perimeter is of smaller diameter than the lower perimeter. For example, on a device having a bottom 11 about five and one half feet in diameter, the open top 13 is preferably about four and a half feet in diameter. With a one foot high wall 12, the device is capable of holding 150 gallons of hazardous liquid 99.

Figure 3:
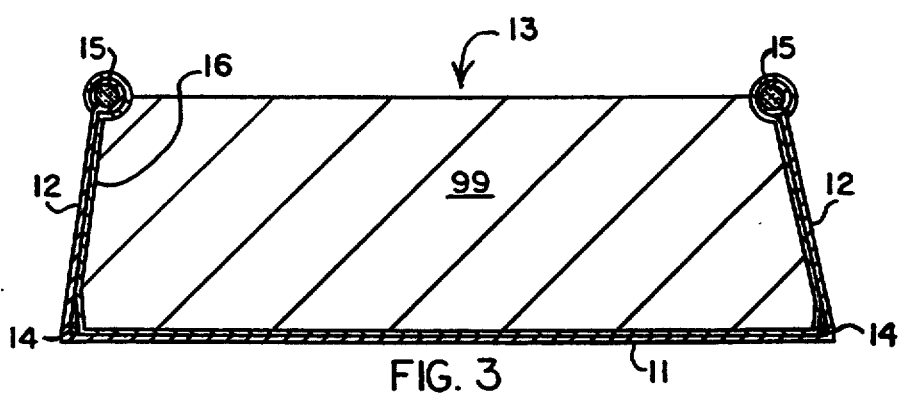
FIG. 3 is a cross-sectional view of the invention taken along line III—III of FIG. 2.

A floating member 15 is incorporated into the upper perimeter of wall 12. Floating member 15 is preferably ring shaped and may be attached directly to wall 12 or the upper edge of wall 12 may be folded over floating member 15 and attached to itself, as shown in FIG. 3. Floating member 15 is composed of a semi-rigid material, such as for example a polyethylene foam, such that it has a stable ring shape but can be collapsed or folded onto itself. In use, floating member 15 acts to raise wall 12 as liquid 99 fills the interior of the device from the flat configuration shown in FIG. 1 to the raised configuration shown in FIG. 2. Since wall 12 has no internal or external framework, it will balloon outward as the liquid 99 fills the interior, becoming more vertical as the liquid 99 level raises the floating member 15. In the preferred embodiment, the conical wall 12 allows liquid 99 to more fully encircle the floating member 15 during the rising action.

Figure 4:
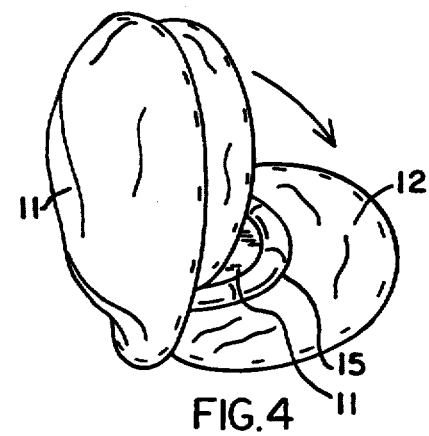
FIG. 4 illustrates how the invention is collapsed into its smaller configuration by twisting the frame member.

A resilient frame member 14 is connected adjacent to or incorporated in the perimeter of bottom 11 or the lower edge of wall 12. Frame member 14 is composed of a flexible resilient material which maintains a stable and rigid circular or annular configuration, yet can be folded or collapsed to create a smaller stable configuration for storage purposes. Frame member 14 is preferably self-opening from the collapsed state such that energy stored in the collapsed configuration acts to propel the frame member 14 into the open stable configuration. For example, frame member 14 is preferably composed of a thin circular or annular strip of spring steel, although any plastic or spring configuration having similar properties could be utilized. Spring steel has the property of being collapsible into smaller, generally circular configurations by twisting it a set number of times, as shown in FIG. 4. The stored energy propels the spring steel into the full open configuration when jolted or manipulated. Frame member 14 in its untwisted state maintains the bottom 11 in the fully spread position. Its rigidity allows the device to be located under a spill by throwing, with no need to pull the device under the liquid flow to properly locate it.

In an alternative preferred embodiment, as shown in FIG. 3, the device can further comprise a liner member 16. Liner member 16 can be composed of material similar to the material composing the wall 12 or bottom 11 if the benefits of two layers are desired. Preferably, however, liner 16 is composed of a liquid impermeable material having good chemical resistance, such as for example polyethylene film, which allows wall 12 and bottom 11 to be composed of a material having better strength and wear resistance. Liner 16 is attached to the upper perimeter of wall 12 or directly to floating member 15.

The device is ideal for use with transport vehicles containing hazardous liquid materials, which can be defined to include large gasoline or diesel fuel tanks found on most large trucks. It can also be used by emergency response units to capture liquid spilling from gas tanks, radiators, etc. as a result of automobile accidents. Additionally, it can be used in buildings having pipes to carry hazardous liquid. It can be stored in a very small area in its collapsed state. Should a leak occur, the operator takes the device and jolts or manipulates it, the frame member 14 causing it to self-open into the full annular position with the semi-rigid floating member 15 providing a large open top 13 for ease in accurately positioning the device under the leak. Because the frame member 14 is rigid in its open state, the open device can be thrown under the leak, precluding direct exposure to the operator of the hazardous liquid. As the liquid 99 fills the interior, the floating member 15 raises wall 12, thereby capturing a large quantity which would normally be lost to the environment, preventing possible health or pollution hazards.

It is contemplated that obvious substitutions or equivalents may be apparent to those skilled in the art, and the above examples are for purposes of illustration. The true scope and definition of the invention is to be as set forth in the following claims.

We claim:

1. A collapsible liquid container device comprising a bottom member having a perimeter, a wall member having a bottom edge and an upper edge, said bottom edge connected to the perimeter of said bottom member to form a liquid impermeable container having an open top, a floating member connected to said upper edge of said wall member, and a resilient frame member connected adjacent to said perimeter of said bottom member, said frame member being collapsible from an open stable configuration into a smaller stable configuration, said frame member utilizing stored energy to self-open from the smaller stable configuration to the open stable configuration, whereby said device can be collapsed into a small configuration for storage and self-opens into a full open configuration for use.

2. The device of claim 1, where said floating member is composed of a semi-rigid foam.

3. The device of claim 1, where said floating member is ring-shaped and composed of a semi-rigid, collapsible foam.

4. The device of claim 1, where said frame member is composed of an annular strip of spring steel.

5. The device of claim 1, further comprising a liquid impermeable inner liner member.

6. The device of claim 5, where said liner member has good chemical resistance properties.

7. The device of claim 1, where the diameter of said open top is smaller than the diameter of said perimeter of said bottom.

8. The device of claim 1, where said upper edge of said wall member has a smaller circumference than said bottom edge of said wall member.

* * * * *

(12) EX PARTE REEXAMINATION CERTIFICATE (6271st)
United States Patent
Shaw et al.

(10) Number: US 5,429,437 C1
(45) Certificate Issued: Jun. 24, 2008

(54) COLLAPSIBLE, SELF-EXPANDING LIQUID CONTAINER

(75) Inventors: Mark D. Shaw, Ponte Vedra, FL (US); J. Tad Heyman, Jacksonville, FL (US); Laurence M. Bierce, Jacksonville, FL (US); Dorian T. True, III, Augusta, GA (US); Marion L. Jones, Jr., North Augusta, SC (US)

(73) Assignee: Ultratech International, Inc., Jacksonville, FL (US)

Reexamination Request:
No. 90/007,736, Sep. 23, 2005

Reexamination Certificate for:
Patent No.: 5,429,437
Issued: Jul. 4, 1995
Appl. No.: 08/287,761
Filed: Aug. 9, 1994

(51) Int. Cl.
*B65D 33/00* (2006.01)
*B65D 33/24* (2006.01)
*B65D 33/16* (2006.01)
*B65D 30/00* (2006.01)
*A45C 7/00* (2006.01)

(52) U.S. Cl. .................. 383/33; 383/43; 383/71; 383/127; 220/9.2; 220/904

(58) Field of Classification Search .......... 220/9.2, 220/9.3, 574, 666, 573; 135/126; 4/506, 488; 160/370.21, 377
See application file for complete search history.

(56) References Cited

U.S. PATENT DOCUMENTS

| | | | | |
|---|---|---|---|---|
| 1,691,904 A | * | 11/1928 | Gamble | 206/8 |
| 2,529,872 A | * | 11/1950 | Hasselquist | 4/506 |
| 2,719,982 A | * | 10/1955 | Hasselquist | 4/506 |
| 4,124,049 A | * | 11/1978 | Yamaguchi | 220/216 |
| 4,136,725 A | * | 1/1979 | Phillips et al. | 220/562 |
| 4,559,652 A | * | 12/1985 | Uchitelle | 4/487 |
| 4,826,030 A | * | 5/1989 | Valley | 220/573 |
| 5,116,273 A | * | 5/1992 | Chan | 160/370.21 |
| 6,112,930 A | * | 9/2000 | McAtarian | 220/9.1 |

FOREIGN PATENT DOCUMENTS

WO WO/89/06624 * 7/1989

* cited by examiner

*Primary Examiner*—Aaron J. Lewis

(57) ABSTRACT

A liquid container especially suited for use in the capture of liquid hazardous materials is disclosed, the container comprising a bottom, preferably circular, and a generally vertical wall, preferably annular or conical, attached to the perimeter of the bottom to form a container with a large open top. The bottom and wall are composed of a flexible, liquid impermeable material, preferably a material that is also chemical resistant and wear resistant. The container may further comprise a liner. The top edge of the wall incorporates a semi-rigid floating member which completely encircles the opening, the floating member being collapsible or foldable for storage purposes. The perimeter portion of the bottom incorporates a structural or frame member which is composed of a flexible, resilient material which provides rigidity to the perimeter and acts to spread the bottom to its maximum size. The frame member is collapsible on itself such that the device can be collapsed into a small size for storage. The frame member is self-opening from the collapsed state to the full open rigid state.

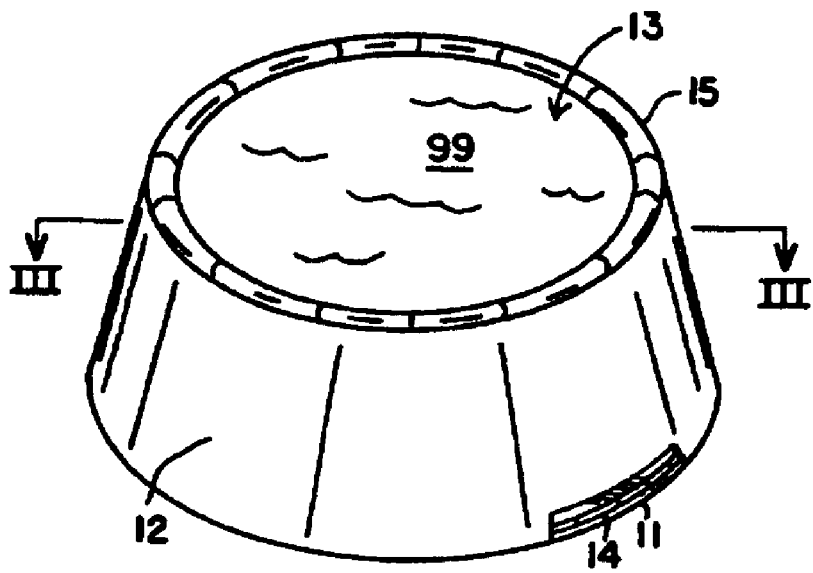

EX PARTE REEXAMINATION CERTIFICATE ISSUED UNDER 35 U.S.C. 307

THE PATIENT IS HEREBY AMENDED AS INDICATED BELOW

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–8 is confirmed.

New claims 9–14 and 15–20 are added and determined to be patentable.

9. *A collapsible liquid container device comprising*
*a bottom member having a perimeter,*
*a non-self-supporting wall member having a bottom edge and an upper edge, said bottom edge connected to the perimeter of said bottom member to form a liquid impermeable container having an open top,*
*a floating member connected to said upper edge of said wall member, and*
*a resilient, annular frame member connected adjacent to said perimeter of said bottom member, said frame member being collapsible from an open stable configuration into a smaller stable configuration, said frame member utilizing stored energy to self-open from the smaller stable configuration to the open stable configuration,*
*whereby said device can be collapsed into a small configuration for storage and self-opens into a full open configuration for use.*

10. *The device of claim 9, where said floating member is composed of a semi-rigid foam.*

11. *The device of claim 9, where said floating member is ring-shaped and composed of a semi-rigid, collapsible foam.*

12. *The device of claim 9, where said frame member is composed of a strip of spring steel.*

13. *The device of claim 9, further comprising a liquid impermeable inner liner member.*

14. *The device of claim 9, where the diameter of said open top is smaller than the diameter of said perimeter of said bottom.*

15. *A collapsible liquid container device comprising*
*a bottom member having a perimeter,*
*a wall member having a bottom edge and an upper edge, said wall member having no internal or external support, said bottom edge connected to the perimeter of said bottom member to form a liquid impermeable container having an open top,*
*a floating member connected to said upper edge of said wall member, and*
*a resilient, annular frame member connected adjacent to said perimeter of said bottom member, said frame member being collapsible from an open stable configuration into a smaller stable configuration, said frame member utilizing stored energy to self-open from the smaller stable configuration to the open stable configuration,*
*whereby said device can be collapsed into a small configuration for storage and self-opens into a full open configuration for use.*

16. *The device of claim 15, where said floating member is composed of a semi-rigid foam.*

17. *The device of claim 15, where said floating member is ring-shaped and composed of a semi-rigid, collapsible foam.*

18. *The device of claim 15, where said frame member is composed of a strip of spring steel.*

19. *The device of claim 15, further comprising a liquid impermeable inner liner member.*

20. *The device of claim 15, where the diameter of said open top is smaller than the diameter of said perimeter of said bottom.*

\* \* \* \* \*